Patented Aug. 25, 1936

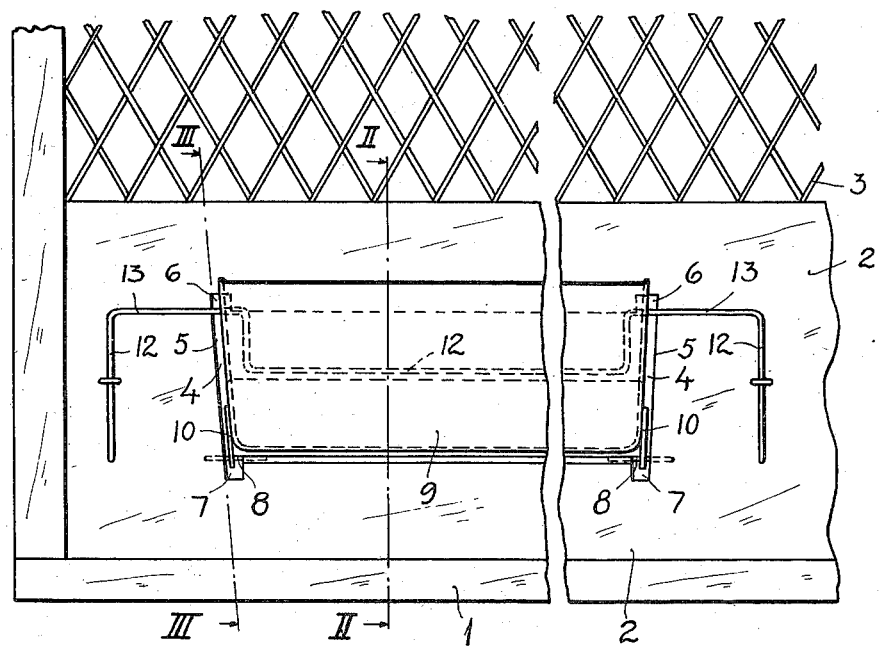
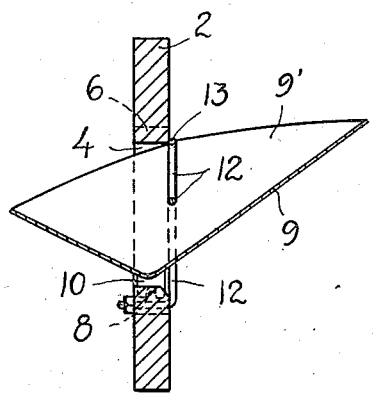
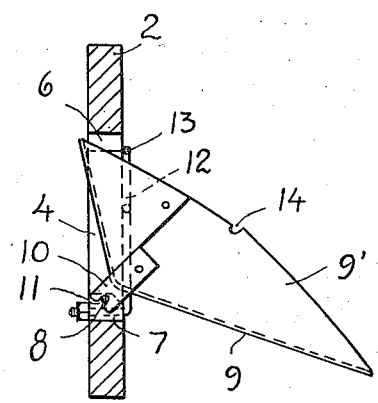

2,052,460

UNITED STATES PATENT OFFICE 2,052,460

FEEDING DEVICE FOR FOXES, POULTRY, OR OTHER ANIMALS CONFINED IN CAGES OR SIMILAR ROOMS

Einar Gilbo, Oslo, Norway

Application October 17, 1934, Serial No. 748,733
In Norway July 25, 1934

2 Claims. (Cl. 119—63)

The present invention relates to a feeding device, which is specially designated for foxes, but which also with advantage may be used for poultry or any other animals which are confined in cages or similar rooms.

The invention is mainly distinguished in that a feeding container is situated in an opening in the wall of the cage or room and mounted tiltably about an axis parallel with said wall, so that the container, by means of a suitable locking mechanism, may be secured in one or more predetermined positions. Further the invention is characterized by the opening in the wall and the mounting of the container therein being so arranged that the container may be removed from the opening in an easy manner.

An embodiment of the invention is illustrated as an example in the accompanying drawing in which, Figure 1 shows the device from the outer side of the cage, Figure 2 shows a section along the line II—II in Figure 1, and Figure 3 shows a section along the line III—III in Figure 1 with the container tilted to its outmost position.

In the drawing 1 denotes a cage or room one wall of which consists of a lower frame 2 and an upper wire-netting 3 which may be secured to the frame as shown. In the frame 2, at a suitable height above the floor, is arranged an opening 4, the ends 5 of which preferably diverge somewhat upwardly as shown in Figure 1.

At the upper and lower corners the opening 4 is provided with notches 6 and 7 respectively. Across the lower notches 7 are arranged bars 8 serving as tilting pivots for a feeding container 9 which rests on said bars by means of downwardly projecting arms 10 secured to the ends of the container and provided with notches 11 in which the bars 8 are inserted. The container 9 preferably is of angle-shaped cross-section with unequal legs and is placed in the opening with the longest leg directed outwardly from the wall of the cage, as shown in the drawing.

In order to secure the container in the desired position, a rod 12 is secured to the frame 2 at each end of the container 9, which rod has horizontal springy portions 13 co-operating with notches 14 in the end walls 9' of the container 9. In order to prevent the animals in the cage from leaving the same through the container 9, or through the opening 4 when the container is removed, the portion of the rod 12 which connects the portions 13 is bent downwardly so that it extends in the longitudinal direction of the opening 4 approximately at the middle of the same as shown.

When the container 9 stands in the position shown in Figure 2, which is the position in which it is in use, it may be filled in an easy manner from the outside of the cage so that it becomes unnecessary to enter the cage—which is an advantage especially in connection with cages for foxes and similar animals in which the floor generally consists of wire-netting—and for that reason the cage may be made lower.

Owing to the fact that the container is fixed during the feeding it is not possible to upset the same so that the food is spoiled.

If remnants of food are to be removed, or the container should be cleaned, the middle portion of the rod 12 is pressed upwardly whereby the portions 13 are removed from the notches 14, so that the container is released and may be tilted outwardly to the position shown in Figure 3 in which the inner edge of the container abuts the inner surface of the frame 2. In this position the container as well as the rod 12 may be cleaned in easy manner and to such a degree as is generally satisfactory without removing the container from the cage. Thereby accidental exchange of containers belonging to different cages is avoided. This makes it unnecessary to boil all the containers in order to avoid transmission of infection between the animals.

After the cleaning is effected the container may be returned to the normal position by merely swinging the same upwardly until the portions 13 of the rod 12 slip into the notches 14.

However, if the container for any reason is to be removed from the opening 4 this may be effected in an easy manner, as the container, standing in the position shown in Figure 3, may be raised to such a height that the bars 8 disengage the notches 11 in the arms 10, and thereafter the container may be drawn out. The insertion of the container is effected in the same manner with the steps reversed.

As will be understood the detailed construction may be varied in many ways without departing from the scope of the invention.

I claim:

1. In a feeding device for foxes or other animals confined in a cage provided with an opening in a wall having notches at the upper and lower corners of said opening, pivots secured in said wall and arranged across the notches at the lower corners, a container having an angle-shaped bottom with an obtuse angle between the sides placed in said opening and downwardly projecting arms on the container having notches engaging said pivots thereby tiltably supporting the container, and a rod secured to said wall and bent downwardly so that the middle portion of the same extends in the longitudinal direction across said opening approximately at the middle thereof, thereby preventing the animals from leaving the cage through the container or through said opening when the container is removed therefrom.

2. A feeding device for foxes or other animals confined in a cage provided with an opening in a wall, comprising a container having angle-shaped cross-section fitting in said opening and supported tiltably and removably about an axis parallel with the wall and lying below the bottom of the container, and a rod secured to the wall having horizontal springy portions cooperating with notches provided in the end walls of the container adapted to secure the container in feeding position, and a downwardly bent portion connecting said springy portions and extending in the longitudinal direction across said opening approximately at the middle of the same serving to prevent the animals from leaving the cage through the container or through said opening when the container is removed therefrom.

EINAR GILBO.